UNITED STATES PATENT OFFICE.

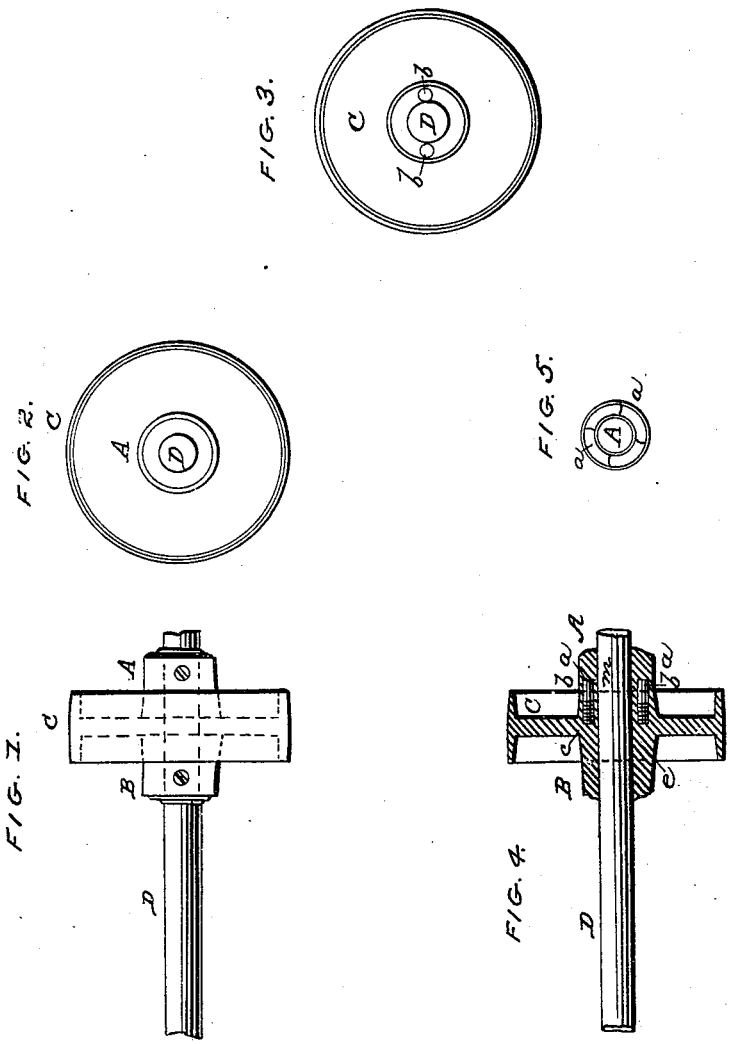

PETER RODIER, OF SPRINGFIELD, MASSACHUSETTS.

IMPROVEMENT IN CLUTCH-PULLEYS FOR DRIVING SEWING-MACHINES.

Specification forming part of Letters Patent No. 48,840, dated July 18, 1865.

*To all whom it may concern:*

Be it known that I, PETER RODIER, of Springfield, Hampden county, Commonwealth of Massachusetts, have invented a new and useful Attachment to Sewing-Machines; and I do hereby declare that the following is a full and exact description thereof, reference being had to the accompanying drawings, making a part of this specification.

Most sewing-machines are so constructed that the right motion of the needle can be given only by turning the driving-shaft in one direction, and any attempt to run the machine backward—that is, to turn the shaft in the other direction—causes not only a disarrangement of the work, but frequently a breakage of parts. Now as in ordinary machines there is nothing to prevent the shaft from running the machine in whichever way it is turned, accidents of this kind are frequently happening, unless great care is taken to turn the wheel in the right direction at starting.

Now, it is the object of this invention to obtain a simple and compact arrangement by which, when the shaft is turned in the wrong direction, the working parts of the machine may remain stationary and not be operated unless it is turned in the right direction. I will now describe how I accomplish this.

In the drawings making a part of this specification, Figure 1 is a side and Fig. 2 an end view of the driving-shaft and pulley with my invention attached. Fig. 3 is an end view of the pulley; Fig. 4, a longitudinal section, and Fig. 5 a face view of the collar A.

To the shaft D, at the side of the pulley C, which is loose on D, I attach the collar A, which is fastened close up to the hub of the pulley, which is kept in place by the collar B. In this collar A are cut the notches $a\ a\ a\ a$, the bottoms of which are inclined planes, so that the pins $b\ b$, forced out by the springs $c\ c$ in the hub of the pulley, may move over these planes in one direction without difficulty, but are stopped in the other by the shoulders forming the ends of the notches, thus allowing the pulley to turn freely in one direction on the shaft, while, if turned the other way the shaft moves with it. The extreme simplicity of this arrangement makes it impossible to get it out of order, being, as it is, perfectly inclosed, and the only additions to the sewing-machine as ordinarily arranged being the two collars A B and the internal arrangement of A and the springs in the pulley, as described.

It is evident that the pins might be placed in the collar and the notches in the hub, or the arrangement otherwise altered, and I do not therefore wish to confine myself exactly to the arrangement herein described, but claim any other employing substantially the same devices.

I disclaim all attachments to sewing-machines which require the use of a separate shaft or axial bearing from the ordinary shaft or shafts of the machine, and all attachments for any other purpose than that mentioned in these specifications—namely, preventing the pulley or shaft from being driven in a wrong direction; but What I do claim as new, and desire to secure by Letters Patent, is—

The combination of the pulley C of a sewing-machine, loose on the shaft D, with the collars A and B on the same shaft and the spring-pins $b\ b$ and corresponding notches, $a\ a\ a\ a$, substantially in the manner and for the purpose described.

PETER RODIER.

Witnesses:
J. B. GARDINER,
LOUIS C. RODIER.